Sept. 19, 1961   R. WINKLER ET AL   3,000,151
METHOD AND APPARATUS FOR FORMING AND WRAPPING PACKS
OF ENVELOPES AND SIMILAR ARTICLES
Filed May 1, 1957   4 Sheets-Sheet 4
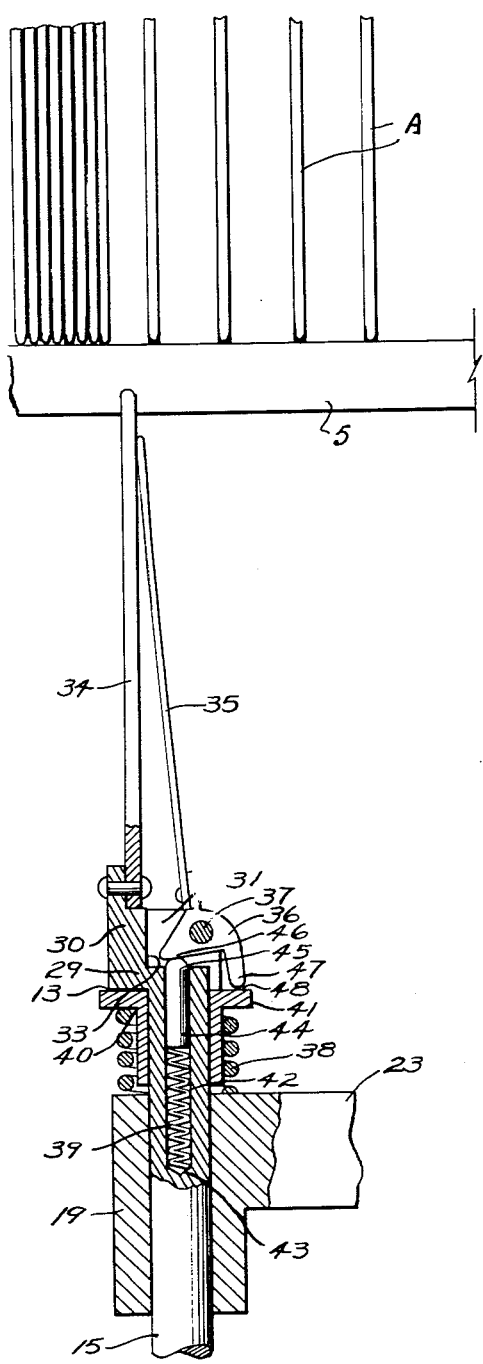
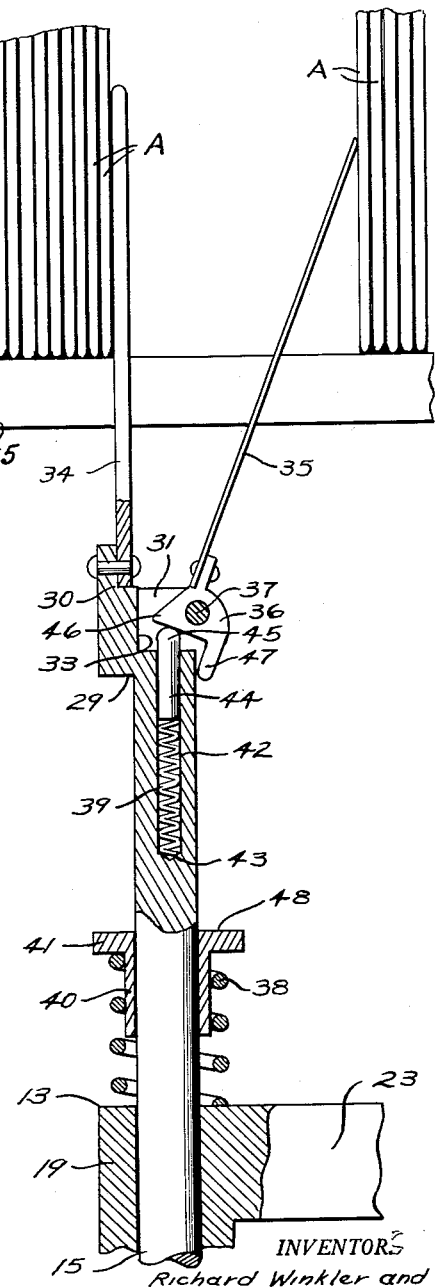
INVENTORS
Richard Winkler and
Kurt Dunnebier
BY Paul E. Mullendore
ATTORNEY

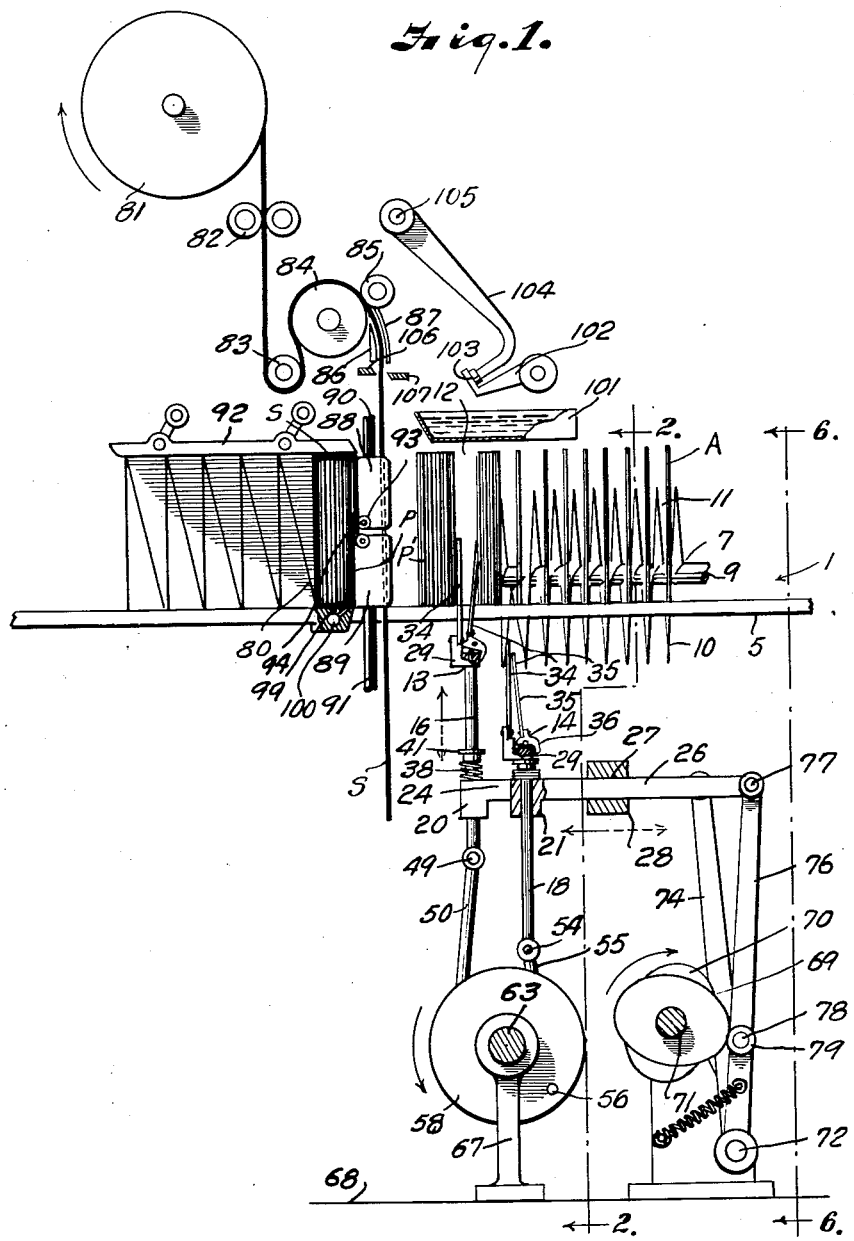

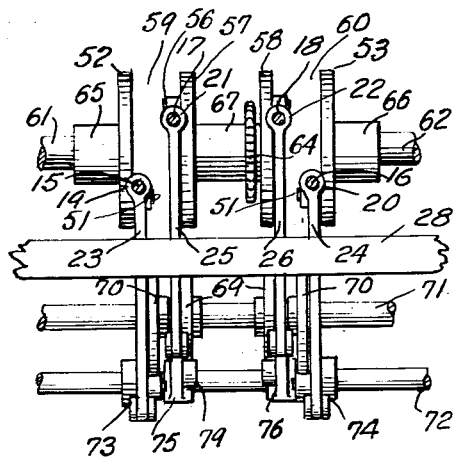
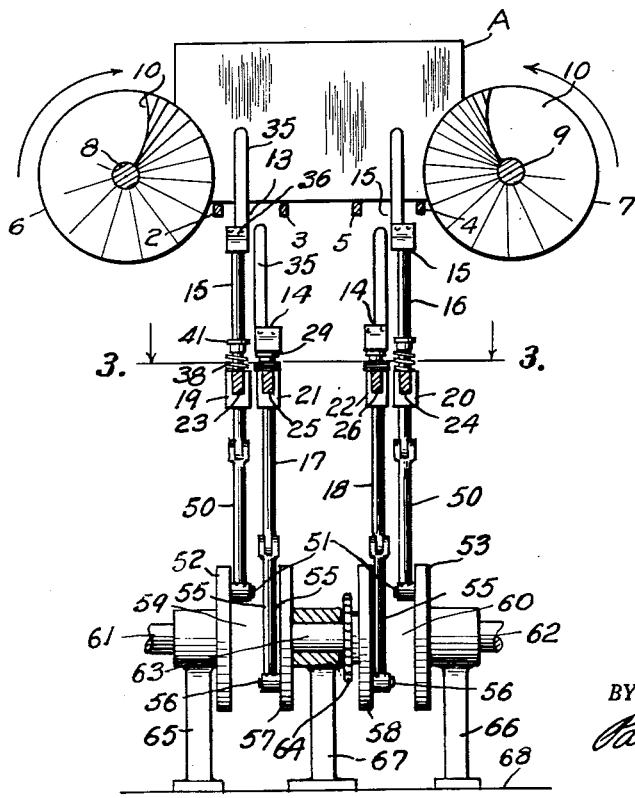

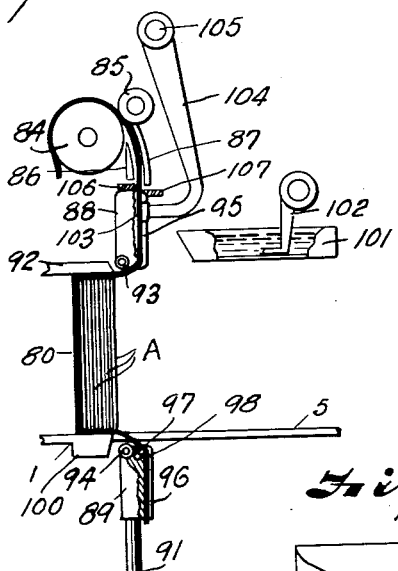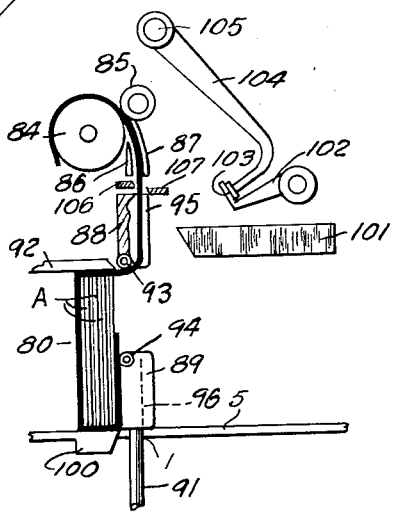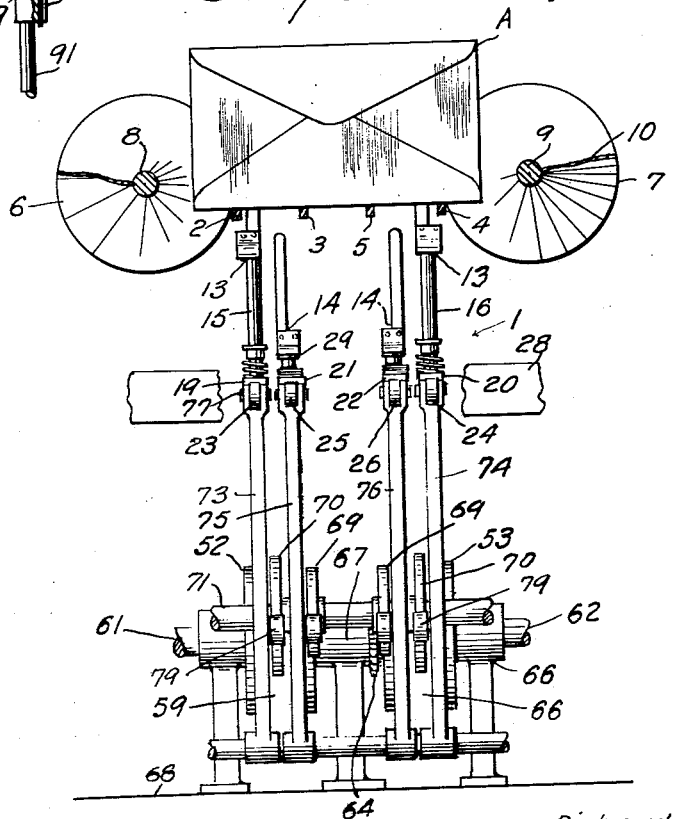

United States Patent Office 3,000,151
Patented Sept. 19, 1961

3,000,151
METHOD AND APPARATUS FOR FORMING AND WRAPPING PACKS OF ENVELOPES AND SIMILAR ARTICLES
Richard Winkler, Rengsdorf, near Neuwied, and Kurt Dunnebier, Wollendorf, near Neuwied, Germany, assignors to Berkley Machine Company, Kansas City, Mo., a corporation of Missouri
Filed May 1, 1957, Ser. No. 656,390
Claims priority, application Germany May 11, 1956
17 Claims. (Cl. 53—3)

This invention relates to an apparatus and method for banding or wrapping packs of envelopes and similar articles into packets, each packet containing a specified number of articles.

For example, manufacturers of envelopes are called upon to furnish envelopes and similar articles in packets which can be sold over the counter by the retail merchant. That is, each packet contains a certain specified number of envelopes wrapped together by a paper band extending therearound, and with the ends of the band secured together by adhesive. Usually the envelopes are discharged from the envelope making machine onto a delivery table in accordance with a specified count and separated into packs, which packs are usually indicated by slight disarrangement of one of the envelopes between the respective packs. The packs are then removed by hand and placed in a separate banding machine. The procedure requires considerable hand operation, with the possibility of error occurring in the number of envelopes gathered into each pack.

Modern high speed envelope making machines are capable of a very high output, and consequently the present method of packeting or wrapping envelopes nullifies the advantages of high speed envelope making machines.

It is, therefore, a principal object of the present invention to provide an apparatus for mechanically counting envelopes and similar articles into packs, conveying the packs, and applying bands around the packs in accordance with the output of a modern envelope making machine.

A further object of the invention is to provide such an apparatus which may be used separately or incorporated into the delivery end of an envelope making machine.

A further object of the invention is to provide an apparatus which is of simple construction and positive in operation, thereby insuring accuracy in the number and formation of each packet.

In accomplishing these and other objects of the invention, as hereinafter pointed out, improved structure is provided, the preferred form of which is illustrated somewhat diagrammatically in the accompanying drawings, wherein:

FIG. 1 is a central longitudinal section through an apparatus for feeding envelopes and similar articles into packs and wrapping the packs into separate packets, each containing a like quantity of the articles. The illustration shows a pack being formed, a previously formed pack moving into position preparatory to banding, and the suction blocks just completing application of a band to a pack.

FIG. 2 is a cross section on the line 2—2 of FIG. 1.

FIG. 3 is a horizontal section on the line 3—3 of FIG. 2.

FIG. 4 is a view of the banding portion of the apparatus, showing the suction blocks in retracted position and ready to close ends of the band over the rear face of a pack and showing severance of the banding strip and application of gum to one end thereof.

FIG. 5 is a similar view, but showing movement of the lowermost suction block to carry one end of the band into sealing position and just prior to start of the other suction block.

FIG. 6 is a cross section on the line 6—6 of FIG. 1.

FIG. 7 is an enlarged side elevational view, partly in section, of one of the separators, showing the arms thereof in collapsed position.

FIG. 8 is a similar view, but showing the arms in open position.

Referring more in detail to the drawings:

1 designates an envelope banding or wrapping apparatus embodying the features of the present invention and which may be incorporated in the delivery end of an envelope making machine, represented by the guide rails 2, 3, 4 and 5, or the apparatus may comprise a separate machine, in which case the envelopes are removed from the envelope making machine and placed upon corresponding guide rails. The envelopes are advanced on edge and in a continuous linear direction along the guide rails by a conveying and separating mechanism, including a pair of spaced apart helical conveyers 6 and 7 having shafts 8 and 9 extending parallel along side of the outermost guide rails 2 and 5 and slightly above the plane of the rails, as best shown in FIGS. 2 and 6.

Each of the conveyers includes a spiral flight 10 of relatively short pitch to engage the ends and lower corner portions of the envelopes, with a single envelope contained within the space 11 between each flight of the conveyers, for example, as illustrated in FIG. 1. The conveyers terminate at a station 12 where the envelopes are assembled into packs, with each pack containing a specified number of envelopes.

The gathering means at the station 12 includes alternately operated pairs of separators 13—14 which are located intermediate the terminal ends of the helical conveyers and in position to engage portions of the envelopes intermediate those portions previously contacted by flights of the conveyers. In this way, space is provided for action of the separators. The separators move up and forward in contact with the envelopes and then downward for backward movement below the guide rails to avoid interference with forward movement of the envelopes to automatically control the advance of the envelopes along the guide rails. Therefore, the separators move about an elongated generally rectangular path with one pair spaced from and following the other pair. The pairs of separators include vertically reciprocatory staffs 15—16 for the pair 13, and 17 and 18 for the pair 14. The staffs have guided support within vertically positioned bearings 19—20 and 21—22. The bearings 19—20, 21—22, are respectively carried on the forward ends of horizontally positioned slide bars 23—24 and 25—26 that are guidingly supported in bearing openings 27 of a cross bar 28 that may form a part of the framework of the apparatus or of the frame of the envelope machine, as the case may be.

Fixed to the upper end of each of the reciprocatory staffs is a head 29 having an upwardly extending lug 30 and spaced ears 31 for forming a recess 33 therebetween. Fixed to the lug 31 and extending upwardly therefrom is a substantially rigid arm 34. The arms 34 are of a sufficient length so that when the staffs are in their uppermost position the arms intercept the path of the envelopes and control forward movement of the envelopes and separate them into packs. In order to facilitate and make the separation sufficiently wide for subsequent banding operations, each separator also includes a resilient arm 35 fixed to a rocker 36. The rocker 36 is pivoted on a cross pin 37 having the ends thereof carried by the ears 31, whereby the arm 35 of each separator is adapted to swing to and from the fixed arm 34, as shown in FIGS. 7 and 8.

The swing of each arm 35 is completely automatic responsive to downward movement of the staffs in the guides of the slide arms and under control by differential action of coil springs 38 and 39, as now to be described. Sleeved on each reciprocatory staff between the guide bearing in which the staffs are mounted and the heads thereof is a collar 40 having a laterally extending annular flange 41 at its upper end forming a seat for the upper end of the coil springs 38, while the lower ends of the coil springs 38 are seated upon the guide bearings on the slide arms, as best shown in FIG. 8. The springs 39 are carried in bores 42 in the upper ends of the staffs, with the springs 39 seating against the bottom of the bores, as shown at 43. The upper ends of the springs 39 support plungers 44, also reciprocable in the bores 42. The plungers 44 have rounded upper ends 45 engaging under forward ends 46 of the rockers 36 under control of a downwardly extending tail portion 47 on the rear end of each rocker. The tail portions 47 of the rockers are adapted to be engaged by upper faces 48 of the collars 40 to move the pivoted arms 35 into contact with the fixed arms 34, as later described. The staffs 15 and 16 have their lower ends pivotally connected by means of wrist pins 49 with links 50. The lower ends of the links 50 connect with crank pins 51 extending laterally from crank plates 52 and 53. The other staffs 17 and 18 are similarly connected by wrist pins 54 with links 55 that are connected with crank pins 56 projecting from crank plates 57 and 58. The crank plates are all shown in axial alignment, but with the crank plates mounted to allow working of the links between the crank plates 52 and 57 and between the crank plates 53 and 58, as shown at 59 and 60 in FIG. 2. The crank plates 52 and 53 are attached to the ends of spaced apart driving shafts 61 and 62, while the intermediate crank plates 57 and 58 are carried on an intermediate shaft 63 which is driven by a driving member 64. The shafts just described are carried in bearing brackets 65, 66 and 67, respectively, the bearing brackets being suitably mounted on a transverse part 68 of the frame below the terminal end of the helical conveyers.

As above stated, the separators are also moved bodily in a fore and aft direction in alternate relation by a pair of cams 69 for one pair of separators and 70 for the other pair. The pairs of cams are fixed to a shaft 71 which is driven in timed relation with the shafts which carry the crank plates. Pivotally mounted on a transverse shaft 72 below and rearwardly of the cam shaft 71 are rocker arms 73—74 and 75—76 that extend upwardly along sides of the respective cams and pivotally connect with the slide bars 23, 24, 25 and 26 by pins 77. Suitably mounted on pins 78 extending laterally from sides of each rocker arm and in position to be contacted by the periphery of the cams are cam followers 79 whereby, when the cams rotate, the pairs of rocker arms are moved in a fore and aft direction to reciprocate the slide bars 23, 24, 25 and 26.

From the station 12, a gathered pack of envelopes is pushed in a forward direction, by the separators, along the guide rails 2, 3, 4 and 5 into a wrapping station 80, at which a paper strip is caused to be extended thereabout and the ends of the strip connected together, preferably by an adhesive. The strip of banding material is stored in a roll on a reel 81 and withdrawn downwardly between pairs of guide rollers 82 under a guide roller 83 and upwardly and over a drive roller 84 which cooperates with a pressure roller 85 in holding the strip in driving contact with the periphery of the drive roller 84, whereby the tape is caused to be withdrawn from the roll and fed downwardly between guide plates 86 and 87 and across the path of the packs of envelopes. The tape is fed downwardly midway of the width of the packs in timed relation with movement of the pairs of separators, and as best shown in FIG. 1.

Movable to and from each other in substantially parallel relation with the depending portions of the tape are suction blocks 88 and 89. The suction blocks are carried on ends of reciprocating rods 90 and 91, respectively, and which are operated in timed relation with the other moving parts of the apparatus to carry ends of the strip around a pack of envelopes as the envelopes are pushed by the separators along the rails 2, 3, 4 and 5, and under upper pressure rails 92 which establish a holding pressure on the packs of envelopes while they are being wrapped. The suction blocks carry a roller 93 and 94 to engage with the strip, and formed in the rear face of the blocks are vertical grooves 95 and 96 for passing the tape therethrough. Each suction block is provided at the adjacent ends between the grooves 95 and 96 and rollers 93 and 94 with suction ports 97 and in the bottoms of the grooves with suction ports 98, whereby the strip is caused to be gripped to the suction blocks to complete movement of the strip around the pack of envelopes.

In order to stabilize the pack and support it while the strip is being applied, the strip is gripped by suction drawn through ports 99 in a fixed suction bar 100 that extends transversely between the innermost guide rails 3 and 4. Suction through the ports is under control of suitable timing valves (not shown), but which are operated in timed sequence with the other moving mechanisms of the apparatus.

Carried above the station 12 is a pan 101 for containing a supply of adhesive. Operable in the pan 101 is a dipper 102 which removes adhesive from the pan and carries it into contact with an applying face 103 of an oscillatory arm 104. The oscillatory arm 104 is carried on a rock shaft 105, which also is operable in synchronism with movement of the upper suction block, to carry the adhesive into contact with the rear face of the strip just prior to severance of a section of the strip from the roll.

The strip is severed between fixed and movable cutting blades 106 and 107, which may be of suitable construction and mounted across the respective face sides of the tape, with the tape feeding therebetween. The movable blade is activated in timed relation with other parts of the apparatus as will be known to those skilled in the art.

Assuming that the apparatus is constructed as described and that it is installed in direct association with an envelope making machine, the operation thereof is as follows:

The envelopes designated A are delivered from the discharge end of the envelope making machine and moved on edge along the rails 2, 3, 4 and 5 in a substantially orderly file with the face side of one envelope facing the rear side of a following envelope. The envelopes A are thus advanced to the point where the end portions thereof engage the flights 10 of the helical conveyers 6 and 7, as shown in FIG. 2. The flights of the conveyers separate the envelopes and move them slightly apart with one envelope engaged between oppositely registering flights of the respective conveyers. The envelopes are, therefore, moved along the rails in timed relation and are discharged at the ends of the conveyers against one pair of separators, for example, the pair 13, to gather a given number of envelopes into a pack. The separators 13 are moved with the arms 34 and 35 into position to engage the envelopes by reciprocating the staffs 15 and 16 thereof by means of the crank disks 52 and 53 and links 50. The staffs are reciprocated within the bearings 19 and 20 of the respective slide arms 23 and 24. Before starting movement, the separators are in their lowermost position, as shown in FIG. 7, and the tail portion 47 of the rockers 36 are engaging the flange 41 of a collar 40 to hold the springs 38 in compressed condition. The rockers for that pair of separators are thus moved on the pivot pins 37 to engage the arms 35 with the fixed arm 34 (see FIG. 7), whereby the arms 44 and 35 are collapsed together and easily moved upwardly between the spaces of the envelopes being advanced by the helical conveyers. The pair of separators 13 are also moved forwardly, but at a slower rate, so that the envelopes stack thereagainst.

As previously stated, the crank disks are operated in timed relation with rotation of the helical conveyers, so that the second pair of separators 14 are projected into position to engage between the last envelope in the pack and the following envelope which forms the first envelope in the next pack to be formed. In this manner a predetermined number of envelopes is gathered into each pack P, as shown in FIG. 1. The pair of separators 14 are moved in the same manner as the separators 13. As soon as the staffs have lifted the tail portions 47 of the rockers 36 out of contact with the faces 48 of the collars 40, the springs 39 and plungers 44 are effective in rocking the movable arms 35 away from the fixed arm and open up a space between the assembled pack P and the next pack P' which is being gathered. As soon as the assembled pack is formed, it is pushed along the guide rails 2, 3, 4 and 5 toward the wrapping station by the pair of separators on the retractive side of the pack and the forward pair have been drawn out of position and returned to form another pack. The forward and backward movement of the pairs of separators is effected by action of the supporting arms 23—24 and 25—26 therefor. The supporting arms are alternately reciprocated in the transverse bar 28 by the cams 70 and 69, the cams engaging the followers 79 on the lever arms 73—74 and 75—76. In the meantime, an end of the banding strip S has been fed downwardly across the path of the pack P, so that the pack engages the strip and moves it forwardly as the pack is being pushed between the transverse suction bar 100 and the pressure rails 92, as shown in FIG. 1. This causes the strip S to be drawn around the forward side of the pack and across the edges of the envelopes. By this time, suction is effective through the transverse bar 100 and through the ports of the suction blocks 88 and 89, whereupon the lower suction block moves up and because of the vacuum existing in the ports thereof takes the depending end of the strip S therewith. As soon as the roller has moved up to the packs, the vacuum is released and the end of the strip is carried against the pack, as shown in FIG. 5.

The dipper 102 applies adhesive to the applicating face 103 of the applicator arm 104, which then swings into position to transfer the adhesive from the applicating face onto the portion of the band engaged by the suction block 88, as shown in FIG. 4. The applicator then moves away and the movable blade comes into position to sheer off a length of strip. The suction block moves downwardly, but as soon as the roller 93 moves into contact with the pack, the suction in the block 88 is shut off and the roller 93 is effective in rolling the end of the strip with the adhesive thereon over the projecting end of the strip held by the block 89 (see FIG. 1). The slide block 89 is the first to move into position, but they move outwardly together. By this time the rollers 84 and 85 have drawn another section of the strip S from the roll and fed it downwardly between the blades and across the path of the next pack P'. After withdrawal of the suction block, the pack P' is pushed into wrapping position. By this time the vacuum has been shut off to the vacuum bar 100 and the pack P is displaced by the pack P', as shown in FIG. 1. The apparatus continues to operate until the foremost wrapped pack is discharged from under the pressure bars 92. By this time the adhesive has become sufficiently set so as to effectively hold the overlapping ends of the wrapping strip or band. The wrapped envelope packets are than removed and boxed in the usual manner.

From the foregoing, it is obvious that we have provided a method and apparatus for wrapping envelopes into packets at a speed corresponding with the output of a modern envelope making machine. It is also obvious that the operation of the separators in timed relation with the helical conveyers act to count the envelopes and assure a correct number in each pack. If for some reason an error has been made, it may be detected by an electronic device or feeler mechanism (not shown) to stop the machine or to deflect the defective packet after it has passed the pressure rails 92.

While we particularly referred to the wrapping apparatus as being associated with an envelope making machine, it is obvious that it may comprise a separate machine, and the envelopes, after delivery from an envelope making machine, may be carried to the wrapping machine and placed in position on the rails so that they are engaged by the flights of the helical conveyers to advance them in proper order to the pack forming and wrapping mechanisms.

We have particularly illustrated the invention in connection with banding of envelopes, but it is to be understood that the invention is applicable to banding paper sheets and other articles, without departing from the spirit of the invention.

What we claim and desire to secure by Letters Patent is:

1. An apparatus for wrapping envelopes into packs, including means for advancing envelopes one after another with the face side of one envelope facing the rear side of an adjacent envelope, separating means for controlling advance of a foremost envelope to cause the envelopes to gather into a pack responsive to advance thereof by said advancing means, separating means for projection into position on the retractive side of the pack to start a succeeding pack, actuating means for alternately projecting and withdrawing the separating means from contact with a pack, means for wrapping the foremost pack of envelopes, means for alternately advancing one separating means to move the gathered pack into said wrapping means and for returning the other separating means for gathering a succeeding pack of envelopes, said separating means having expandable and contractable parts in contact with the envelopes to separate the packs when said parts are expanded and to facilitate passage into position between envelopes advanced by said advancing means when said parts are contracted, and means responsive to said actuating means for effecting operation of said parts of the separating means.

2. An apparatus for wrapping envelopes into packs, including a linear support for the envelopes, means for advancing envelopes one after another along said linear support with the face side of one envelope in facing spaced apart relation with the rear side of an adjacent envelope, separating means for controlling advance of a foremost envelope to cause the envelopes to gather into a pack upon said linear support responsive to advance thereof by said advancing means, a second separating means for projection into one of the spaces between the envelopes for isolating the pack between said separating means, means for alternately projecting and withdrawing the separating means from contact with a pack, means for wrapping the pack of envelopes while carried on the linear support, and means for alternately advancing the separating means to move the gathered pack into said wrapping means and for returning the separating means for gathering a succeeding pack of envelopes, said separating means including a fixed member and a movable member adapted to contact the fixed member for facilitating movement of the separating means into said projecting position and means for moving the movable member away from the fixed member to maintain a space between a preceding pack and a succeeding pack.

3. An apparatus for wrapping envelopes, including spaced apart helical conveyers engaging opposite ends of the envelopes with a single envelope between the adjacent flights of the conveyers for advancing envelopes in file, separating means for retarding advance of a foremost envelope discharged from the helical conveyers to cause the following envelopes to gather into a pack, a second separating means for projection into position on the retractive side of the pack to retain the pack between said separating means, means for alternately reciprocating said separating means in timed relation with the helical conveyers to provide a given number of envelopes in each pack, means for wrapping the foremost pack of envelopes, and means for alternately advancing one separating means to move the gathered pack in line with the file of envelopes into said wrapping means and for returning the other separating means for gathering a succeeding pack of envelopes.

4. An apparatus for wrapping envelopes, including spaced apart helical conveyers engaging opposite ends of the envelopes with a single envelope between the adjacent flights of the conveyers for advancing envelopes in file, separating means for retarding advance of a foremost envelope discharged from the helical conveyers to cause the following envelopes to gather into a pack, a second separating means for projection into position on the retractive side of the pack to retain the pack between said separating means, said separating means having staffs, rotary cranks, links connecting the cranks with said staffs for alternately reciprocating said separating means in timed relation with the helical conveyers to provide a given number of envelopes in each pack, means for wrapping the foremost pack of envelopes, and means for alternately advancing one separating means to move the gathered pack in line with the file of envelopes into said wrapping means and for returning the other separating means for gathering a succeeding pack of envelopes.

5. An apparatus for wrapping envelopes, including spaced apart helical conveyers engaging opposite ends of the envelopes with a single envelope between the adjacent flights of the conveyers for advancing envelopes in file, separating means for retarding advance of a foremost envelope discharged from the helical conveyers to cause the following envelopes to gather into a pack, separating means for projection into position on the retractive side of the pack to retain the pack between said separating means and to start a succeeding pack, said separating means having staffs, rotating cranks, links connecting the cranks with the staffs for alternately projecting and withdrawing the separating means from contact with a pack in timed relation with the helical conveyers to provide a given number of envelopes in each pack, means for wrapping the foremost pack of envelopes, and cam means for alternately advancing one separating means to move the gathered pack into said wrapping means for returning the other separating means for gathering a succeeding pack of envelopes.

6. An apparatus for gathering envelopes into packs, including linear guide rails for supporting the envelopes on edge with the face side of one envelope in facing relation with the rear side of the next envelope, means initially advancing the envelopes along said linear guide rails in spaced apart relation, alternately operating means, one of said means being operable for controlling advance of a foremost envelope to cause the envelopes to gather in a pack responsive to advance thereof by said advancing means while the other of said operating means separates the pack and moves the pack along the guide rails, means for extending a strip of wrapping material across the path of the pack, means for applying adhesive to the strip, means above and below the guide rails and movable toward each other for carrying the wrapping strip around the pack and sealing ends of said strip together across the retractive face of the pack while the pack abuts previously wrapped packs which have been advanced along the guide rails responsive to displacement by a succeeding pack, and a pressure applying means above the guide rails to cooperate with the guide rails to retard movement of the wrapped packs along the guide rails for effecting pressure of one pack against another to hold the shape of the wrapped packs and to maintain pressure on the seals of the wrapping strips until adhesive of said seals become set.

7. An apparatus for banding envelopes into packs, including linear supporting means for carrying the envelopes on edge in upright position, means for advancing envelopes in said upright position one after another in face to face relation with bottom edges thereof movable along the linear supporting means, separating means for gathering the envelopes into packs, means for projecting said separating means transversely of the supporting means for retarding advance of a foremost envelope to cause the following envelopes to gather into a pack upon said linear supporting means, means for wrapping a band around a gathered pack while the gathered pack is carried on said linear supporting means, and means for moving the separating means along said linear supporting means for advancing a previously gathered pack along said linear supporting means into the wrapping means.

8. An apparatus for banding envelopes as described in claim 7, wherein the separating means has a movable arm thereon to widen the space between the packs.

9. An apparatus for banding envelopes into packs, including linear supporting means for carrying the envelopes on edge in upright position, means for advancing envelopes in said upright position one after another in face to face relation with bottom edges thereof movable along the linear supporting means, alternately operable separating means for gathering the envelopes into packs, means for projecting one of said separating means from a retracted position to a position transversely of the supporting means for retarding advance of a foremost envelope to cause the following envelopes to gather into a pack upon said linear supporting means while the other separating means is in a retracted position, means for wrapping a band around a gathered pack while the gathered pack is carried on said linear supporting means, means for advancing the projected separating means along said linear supporting means for advancing a previously gathered pack along said linear supporting means into the wrapping means, said projected separating means being retractable from said pack, and means for correspondingly actuating the other separating means in timed relation for starting a succeeding pack.

10. An apparatus for banding envelopes into packs, including linear supporting means for carrying the envelopes on edge in upright position, helical conveyers on opposite sides of the linear supporting means for engaging opposite ends of envelopes with a single envelope engaged between each flight for advancing envelopes on edge and in upright position along the linear supporting means, separating means, means for projecting said separating means transversely of the supporting means for retarding advance of the envelopes delivered by said helical conveyers to cause the envelopes to gather into a pack upon said linear supporting means, means for wrapping a band around a gathered pack while the gathered pack is carried on said linear supporting means, and means for moving the separating means along said linear supporting means for advancing a previously gathered pack along said linear supporting means into the wrapping means.

11. An apparatus for banding envelopes into packs, including linear supporting means for carrying the envelopes on edge in upright position, means for advancing envelopes in said upright position one after another in face to face relation with bottom edges thereof movable along the linear supporting means, separating means for gathering the envelopes into packs, means for projecting said separating means transversely of the supporting means for retarding advance of a foremost envelope to cause the following envelopes to gather into a pack upon said linear supporting means, means for moving the separating means along said linear supporting means for advancing a previously gathered pack along said linear supporting means, means for feeding a strip of banding material across the advancing side of said gathered pack, means for applying an adhesive to an end of the strip, pressure means cooperating with the linear supporting means to receive the gathered pack therebetween for extending ends of the strip across the upper and lower edges of the gathered pack, and means for carrying the ends of the strip into lapping and sealing relation across the rear side of the pack.

12. An apparatus for banding envelopes into packs, including linear supporting means, means for advancing envelopes one after another with the face side of one envelope facing the opposite side of an adjacent envelope and with the edges thereof movable along the linear supporting means, means for gathering the envelopes into packs while they are advanced along the linear supporting means, means for feeding a strip of banding material across the advancing side of a foremost pack, means for applying adhesive to one end of the strip, pressure means cooperating with the linear supporting means to receive the foremost pack therebetween for carrying ends of the strip across upper and lower edges of the pack, means for carrying the ends of the strip across the rear side of the pack to effect connection thereof by said adhesive, and means for retracting said band carrying means for advance of a succeeding pack.

13. A method of wrapping envelopes, including advancing envelopes in a linear path one after another with the face side of one envelope facing the rear side of an adjacent envelope, controlling advance of a foremost envelope while being advanced in said linear path to cause the following envelopes to gather into a pack, separating the pack from the following envelopes, advancing the pack in said linear path to a wrapping station, and applying a wrapping material around said pack while the pack is carried in said linear path.

14. A method of banding envelopes into packets, including advancing envelopes one after another through a linear path with the face side of one envelope facing the rear side of an adjacent envelope, controlling advance of a foremost envelope in said path to cause a number of envelopes to gather into a pack, separating the pack from the following envelopes and advancing the pack along said linear path to a wrapping station, feeding a strip of wrapping material from a roll across one side of the pack while retained in said linear path and in sufficient length to extend about the pack and leave overlapping ends, applying adhesive to the strip, severing the strip near the point of the adhesive, carrying ends of the strip around to the opposite side of the pack while the pack is retained in said linear path, bringing the ends of the strip in overlapping relation to effect a seal thereof by said adhesive and complete a packet of said pack of envelopes, and applying pressure to opposite side edges of previously completed packets to resist movement of the completed packets along said linear path to apply pressure of a succeeding packet against the seal of a preceding packet.

15. A method of banding envelopes into packets, including advancing envelopes in a linear path one after another with the face side of one envelope facing the rear side of an adjacent envelope, controlling advance of a foremost envelope to cause the following envelopes to gather into a pack, separating the pack while being advanced in said linear path from the following envelopes, continuing advance of the pack in said linear path to a wrapping station, feeding wrapping material from a roll across one side of the pack at the wrapping station and while the pack is retained in said linear path, severing a strip from the roll of sufficient length to extend about the pack and provide overlapping ends, carrying ends of the strip across upper and lower edges of the envelopes incidental to movement of the pack in said linear path, bringing the ends of the strip around to the opposite side of the pack, and securing the ends of the strip in overlapping relation at said opposite side of the pack without moving the pack from said linear path.

16. A continuous method of wrapping envelopes into a packet, including advancing envelopes in file through a linear path one after another with the face side of one envelope facing the rear side of an adjacent envelope, controlling advance of a foremost envelope to cause the envelopes to gather into a pack responsive to advance thereof along said path, advancing said pack along said linear path, starting a succeeding pack, wrapping and sealing the wrapper around the foremost pack of envelopes while contained in said linear path, advancing the wrapped packet along said path responsive to advance of the succeeding pack of envelopes, and applying pressure to opposite sides of the packets to resist advance thereof along said linear path and hold said packets in contact with one another to assure sealing of the wrappers.

17. A method of banding envelopes into packets, including advancing envelopes in file through a linear path one after another with the face side of one envelope facing the rear side of an adjacent envelope, separating a given number of the advancing envelopes from the others to form a pack, advancing the pack along the linear path to a wrapping station, wrapping a strip of banding material around said pack while the pack is contained in said linear path to form a packet, sealing together the ends of the strip, separating a like number of envelopes to form a second pack, and advancing the succeeding pack into the wrapping station and to push the first wrapped packet from the wrapping station, and continuing advance of the wrapped packets in contact with each other along said linear path until the seal has become set.

References Cited in the file of this patent
UNITED STATES PATENTS

| | | |
|---|---|---|
| Re. 18,341 | Smith et al. | Jan. 26, 1932 |
| 440,401 | Ethridge | Nov. 11, 1890 |
| 568,656 | Boyer | Sept. 29, 1896 |
| 1,221,196 | Lewis | Apr. 3, 1917 |
| 1,261,612 | Powers | Apr. 2, 1918 |
| 2,109,527 | Fenton | Mar. 1, 1938 |
| 2,341,705 | Fedorchak et al. | Feb. 15, 1944 |
| 2,765,602 | Hibbaurd et al. | Oct. 9, 1956 |
| 2,768,489 | Brown et al. | Oct. 30, 1956 |